United States Patent
Hoffman et al.

(10) Patent No.: US 6,797,050 B2
(45) Date of Patent: Sep. 28, 2004

(54) USE OF FERMENTATION RESIDUES AS FLOW-ENHANCING AGENTS IN CEMENTITIOUS MATERIALS

(75) Inventors: Andrew J. Hoffman, Mt. Zion, IL (US); Michael D. Harrison, Decatur, IL (US)

(73) Assignee: A.E. Staley Manufacturing Co., Decatur, IL (US)

( * ) Notice: Subject to any disclaimer, the term of this patent is extended or adjusted under 35 U.S.C. 154(b) by 93 days.

(21) Appl. No.: 10/200,813

(22) Filed: Jul. 22, 2002

(65) Prior Publication Data

US 2004/0011258 A1 Jan. 22, 2004

(51) Int. Cl.[7] .................. C04B 24/00; C04B 24/04; C04B 24/10; C04B 24/14
(52) U.S. Cl. .................. 106/696; 106/724; 106/727; 106/728; 106/729; 106/819; 106/823
(58) Field of Search ................ 106/696, 724, 106/727, 728, 729, 819, 823, 725, 730

(56) References Cited

U.S. PATENT DOCUMENTS

| | | | |
|---|---|---|---|
| 2,435,594 A | * | 2/1948 | MacPherson |
| 3,536,507 A | * | 10/1970 | Klein |
| 4,311,721 A | | 1/1982 | Yoshizawa et al. ......... 426/623 |
| 4,336,335 A | * | 6/1982 | Muller et al. ............... 435/161 |
| 5,662,810 A | | 9/1997 | Willgohs ..................... 210/781 |
| 5,760,078 A | | 6/1998 | Hamstra et al. ............ 514/556 |
| 6,315,919 B1 | | 11/2001 | Sapienza .................... 252/70 |
| 6,558,461 B2 | * | 5/2003 | Lebo, Jr. et al. ............ 106/725 |

FOREIGN PATENT DOCUMENTS

| | | | |
|---|---|---|---|
| CN | 1072912 | * | 6/1993 |
| CN | 1074710 | * | 7/1993 |
| CN | 1355157 | * | 6/2002 |
| DE | 1075493 | * | 2/1960 |
| DE | 2331670 | * | 1/1995 |
| EP | 1136459 | * | 9/2001 |
| GB | 2376462 | * | 12/2002 |
| JP | 09002882 | * | 1/1997 |
| JP | 10230507 | * | 9/1998 |
| JP | 11335180 | * | 12/1999 |
| PL | 43758 | * | 12/1960 |
| PL | 46430 | * | 11/1962 |
| RO | 52618 | * | 3/1971 |

OTHER PUBLICATIONS

"Utilization of Molasses Fermentation Product as Water Reducing Admixture for Concreted" Ito et al. Hakko Kyokaishi (1974), 32(1), 20–5.*

* cited by examiner

Primary Examiner—Paul Marcantoni
(74) Attorney, Agent, or Firm—Williams Morgan & Amerson, P.C.

(57) ABSTRACT

Herein is disclosed an admixture, for concrete, gypsum panels, and other cementitious products, derived from fermentation still bottoms. The admixture typically comprises protein, glycerol, and lactate, as well as smaller amounts of other alcohols, sugars, and other organic acids. The admixture may be present as a solution (typically comprising about 30–50 wt % solids) or as a dry mixture. The admixture allows increased flow and reduced water use in concrete and gypsum slurries used in gypsum panel production. Concrete, cement, and gypsum premixes, ready-mixes, and poured structures are disclosed.

28 Claims, 1 Drawing Sheet

Figure 1

USE OF FERMENTATION RESIDUES AS FLOW-ENHANCING AGENTS IN CEMENTITIOUS MATERIALS

BACKGROUND OF THE INVENTION

1. Field of the Invention

The present invention relates generally to the fields of microbial fermentation and cementitious admixtures. More particularly, it concerns the use of fermentation residues to improve the properties of concretes and similar products.

2. Description of Related Art

Fermentation is a well-known technique for producing a number of commercially relevant organic compounds, including, but not limited to, ethanol and organic acids. In fermentation, a microorganism, in many cases yeast, is grown in a fermentation vessel on a medium suitable for the microorganism's growth. A commonly-used medium for yeast comprises dextrose and corn steep liquor. During the course of fermentation, the microorganism biomass increases and a commercially relevant target product is generated. After microorganism growth is complete, the target product is isolated, typically by one or more of distillation, crystallization, solvent extraction, and chromatographic separation. After recovery of the target product the microorganism biomass, non-fermentable components of the medium, and water-soluble compounds generated by the microorganism remain in the fermentation vessel. These components together may be referred to as "beer still bottoms" or "fermentation still bottoms."

To dispose of beer still bottoms, producers frequently pass this material to the animal feeds industry. This does capture some economic value from the material; however, this value is typically very low. Therefore, producers would prefer to capture more economic value from beer still bottoms than is possible from animal feeds uses.

Concrete is a ubiquitous construction material, both in the United States and in most countries of the world. In the United States during the year 2000, roughly 440 million cubic yards of ready-mix concrete were produced. In order to save on the amount of water used, enhance the properties of the concrete prepared therefrom, or both, about 90% of all ready-mix concrete in the United States is treated with an admixture. Low range water reducing admixtures are often used at about 0.25 gal per cubic yard. High range water reducing admixtures are often used at about 1 gal per cubic yard. Assuming that these admixtures are produced as solutions comprising 50 wt % solids, annual admixture demand in the United States alone would be in the range of 50 million pounds to 100 million pounds.

Therefore, it would be desirable to have a new and valuable use for beer still bottoms or one or more components thereof. It would also be desirable to have cementitious compositions with improved flow and related properties without a concomitant increase in the amount of water required in the cementitious composition. It is well known in the art that increased water in the cementitious slurry will decrease the ultimate strength of the hardened material.

Yoshizawa et al., U.S. Pat. No. 4,311,721, reports the extracting of water-soluble compounds from fermentation still bottoms and the use of the water-soluble compounds in a fermentation medium or an animal feed.

Willgohs, U.S. Pat. No. 5,662,810, discloses the use of dewatered beer still bottoms as an animal feed.

Hamstra et al., U.S. Pat. No. 5,760,078, teaches the extraction of potassium salts from the water-soluble compounds of fermentation still bottoms, and the use of such potassium salts as a fertilizer.

Sapienza, U.S. Pat. No. 6,315,919, reports the use of water-soluble compounds from beer still bottoms as a deicing agent.

SUMMARY OF THE INVENTION

In one embodiment, the present invention relates to a composition comprising a cementitious material and a fermentation residue.

In another embodiment, the present invention relates to a method of preparing a composition comprising a cementitious material and a fermentation residue, the method comprising (i) growing a microorganism on a medium, to form at least a microorganism biomass and fermentation residue; (ii) separating the fermentation residue from the microorganism biomass; and (iii) combining the fermentation residue with the cementitious material, to form the composition.

In still another embodiment, the present invention relates to a method of producing a cementitious structure, comprising (i) combining at least a fermentation residue, a cementitious material, and water, to yield a slurry; (ii) forming the slurry into an unset cementitious structure; and (iii) setting the unset cementitious structure, to yield the cementitious structure.

In a further embodiment, the present invention relates to a composition, comprising a fermentation residue, water, and an inorganic material dispersed in the water.

In yet a further embodiment, the present invention relates to a method of preparing a composition comprising a fermentation residue, water, and an inorganic material dispersed in the water, the method comprising: (i) growing a microorganism on a medium, to form at least a microorganism biomass and fermentation residue; (ii) separating the fermentation residue from the microorganism biomass; and (iii) combining the fermentation residue with the water and the inorganic material, to form the composition.

In still a further embodiment, the present invention relates to a method of producing a paper structure containing an inorganic material, comprising: (i) combining a fermentation residue with water and an inorganic material, to yield a solution; (ii) treating the paper structure with the solution, to yield a treated paper structure; and (iii) removing water from the treated paper structure, to yield the paper structure containing the organic material.

The various embodiments of the present invention provide a new and valuable use for fermentation residues. The present invention also provides for cementitious compositions with improved flow and related properties without a concomitant increase in the amount of water required in the cementitious composition.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The various embodiments of the present invention relate to a fermentation residue and methods for its production and use.

Fermentation involves growing a microorganism on a medium, to form at least a microorganism biomass and fermentation still bottoms comprising water-soluble compounds and insoluble compounds. A typical fermentation yields a target product, water, microorganism biomass, and water-soluble compounds. The microorganism biomass and water-soluble compounds may together be referred to as "corn stillage." The remaining contents of the fermentation medium, after removal of the target product and the microorganism biomass, may be referred to as a "fermentation residue" or "distillers solubles."

The growing step can involve any microorganism and any medium known to one of ordinary skill in the art to be suitable for growing the microorganism. Typical microorganisms useful in the method include, but are not limited to, yeast, other fungi, and bacteria, among others. Media appropriate for the growing of any particular microorganism will generally be well known in the art. The growing step will typically take place in a fermentor at a temperature, pressure, pH, duration, and other parameters which allow the microorganism to grow to a desired concentration, typically a static concentration at the upper range of a sigmoidal growth curve. During the growing step, a microorganism biomass and fermentation residue will form.

Also during the growing step, the microorganism biomass may produce at least one target product, i.e. a desirable compound readily produced by and extractable from a microorganism biomass. Typically, the microorganism is grown on the medium with the primary objective of producing a target product or compounds. However, this is not necessary. The target product or compounds produced will depend on the microorganism and the medium. The microorganism can, but need not, be a recombinant organism capable of producing target products other than target products producible by the wild-type or nonrecombinant microorganism. In one embodiment, the microorganism is yeast. In one embodiment, the target product is ethanol. In another embodiment, the microorganism is a Corynebacterium (i.e., a bacterium of the genus Corynebacterium). In another embodiment, the target product is lysine. In one embodiment, the microorganism is a yeast and the at least one target product is ethanol. In another embodiment, the microorganism is a Corynebacterium and the at least one target product is lysine.

If at least one target product is produced by the fermentation, it is desirable to remove the at least one target product, to retain the microorganism biomass and the fermentation residue. If no target product is produced by the fermentation, then such a removal step will not be necessary. Removal of any target product can be performed by any appropriate technique; most commonly, removal of any target product from the microorganism biomass and fermentation still bottoms can be performed by one or more of distillation, crystallization, solvent extraction, and chromatographic separation.

A subsequent step in the process is separating the fermentation residue from the microorganism biomass. In the separating step, after the target product, if any, has been isolated, the fermentation residue is separated from the microorganism biomass by one or more appropriate techniques, such as filtration, evaporation (including evaporation assisted by the application of vacuum, heat, or both), centrifugation, and solvent extraction, among others. Typically, the microorganism biomass and the fermentation residue are subjected to microfiltration. One or more membranes with pore sizes in the range of from about 50 nm to about 1500 nm are generally suitable. Upon microfiltration, the fermentation residue will generally be present in the permeate, and the microorganism biomass will be present in the retentate. The fermentation residue will generally comprise water-soluble compounds.

Figure 1:
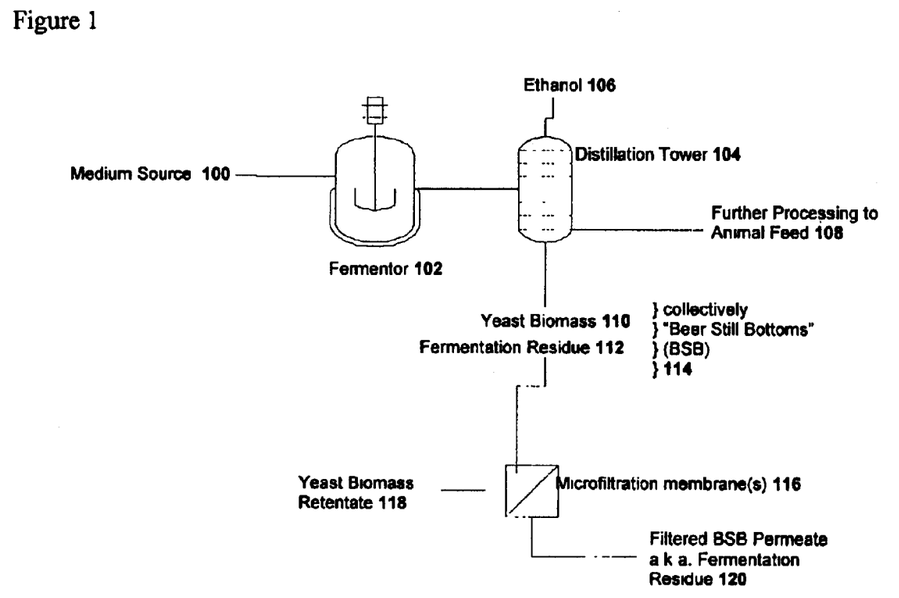
FIG. 1 shows a process flow diagram for the isolation of a fermentation residue from a fermentation process.

The steps described to this point, as exemplified in a typical but non-limiting yeast ethanol fermentation, are shown in FIG. 1. A medium is added from a medium source 100 to a fermentor 102. A yeast culture (not shown) is also added to the fermentor 102, and growth of the yeast is allowed. During this process, ethanol is produced. The medium, yeast biomass, ethanol, and other components are then passed to a distillation tower 104, from which ethanol is extracted in fraction 106. In the conventional process known in the art, the yeast biomass 110 and fermentation residue 112 (collectively known as "beer still bottoms" or "BSB" 114) was processed to animal feed 108. In the present invention, beer still bottoms 114 are fed to a separating apparatus, such as one or more microfiltration membranes 116, wherein the yeast biomass 110 remains in the retentate 118, and the fermentation residue 112 passes to the permeate 120. Alternative process flows and techniques and apparatus usable therein are possible, as will be apparent to one of ordinary skill in the art.

The fermentation residue can be used as-is. The concentration of water-soluble compounds in the fermentation residue will typically only be in the range of about 2% to about 10%. In many applications, it may be suitable to prepare a more highly concentrated solution of the fermentation residue. Therefore, the method may further comprise concentrating the fermentation residue prior to subsequent use thereof. Such concentration can be performed by evaporation, spray drying, or any other appropriate technique known to one of ordinary skill in the art.

The method may further comprise the partial or complete removal of one or more compounds from the fermentation residue.

The composition of the fermentation residue is complex and will depend on the microorganism, the medium, and the properties of the fermentation process (including, but not limited to, duration, medium temperature, medium pH, and medium oxygenation, among others). Also, one or more compounds can be removed from the fermentation residues as a matter of routine experimentation by one of ordinary skill in the art. In various embodiments, the fermentation residue comprises one or more compounds selected from protein; glycerol; at least one organic acid; protein and glycerol; protein and at least one organic acid; glycerol and at least one organic acid; or protein, glycerol, and at least one organic acid.

The fermentation residue can further comprise additional compounds, depending on the microorganism, the medium, and the properties of the fermentation process as described above. In the case of a yeast ethanol fermentation, the fermentation residue can further comprise any one or more of fat, arabitol, sorbitol, trehalose, glucose, fructose, isomaltose, maltose, maltotriose, panose, chloride, sulfate, and phosphate, among other compounds. In the case of a yeast ethanol fermentation, the at least one organic acid can be any one or more of lactate, acetate, formate, pyruvate, succinate, and oxalate, among other compounds.

In one embodiment, the fermentation residue comprises, by weight, from about 8 parts to about 11 parts protein, from about 0.01 parts to about 0.04 parts fat, from about 6 parts to about 10 parts glycerol, from about 0.1 parts to about 0.4 parts arabitol, from about 0.1 parts to about 0.8 parts sorbitol, from about 0.5 parts to about 1.2 parts trehalose, from about 0.9 parts to about 1.2 parts glucose, from about 0.05 parts to about 0.10 parts fructose, from about 1.1 parts to about 1.3 parts isomaltose, from about 0.1 parts to about 0.3 parts maltose, from about 0.01 parts to about 0.05 parts maltotriose, from about 0.07 parts to about 0.30 parts panose, from about 0.01 parts to about 0.06 parts linear 4–24 unit dextrose oligomers, from about 2 parts to about 4 parts nonlinear 4–24 unit dextrose oligomers, from about 3 parts to about 6 parts lactate, from about 0.1 parts to about 0.2 parts acetate, from about 0 parts to about 0.03 parts formate, from about 0.1 parts to about 0.2 parts pyruvate, from about 0.4 parts to about 0.6 parts chloride, from about 0.9 parts to about 1.1 parts succinate, from about 0.5 parts to about 0.7 parts sulfate, from about 0.2 parts to about 0.3 parts oxalate, and from about 2 parts to about 4 parts phosphate.

A typical fermentation residue comprises water-soluble compounds in aqueous solution. For such a composition, there is no particular lower limit on the concentration of water-soluble compounds in the solution. However, some minimal concentration of water-soluble compounds will be produced in any typical fermentation. A typical minimum concentration produced by a typical fermentation, but one not to be construed as limiting, is about 2 wt % water-soluble compounds. Also, one of ordinary skill in the art will recognize that a particular fermentation residue intended for a particular application will have a certain minimum economically- and functionally-desirable concentration of water-soluble compounds. In one embodiment, the minimum concentration of water-soluble compounds in the fermentation residue is about 20 wt %. In another embodiment, the minimum concentration of water-soluble compounds in the fermentation residue is about 30 wt %. In still another embodiment, the minimum concentration of water-soluble compounds in the fermentation residue is about 40 wt %.

Also, there is no particular upper limit on the concentration of water-soluble compounds in the fermentation residue. One of ordinary skill in the art will recognize that a particular fermentation residue intended for a particular application will have a certain maximum concentration of water-soluble compounds beyond which higher concentrations may pose little, if any, economic or functional benefit. In one embodiment, the maximum concentration of water-soluble compounds in the fermentation residue is about 60 wt %. In another embodiment, the maximum concentration of water-soluble compounds in the fermentation residue is about 70 wt %. In still another embodiment, the maximum concentration of water-soluble compounds in the fermentation residue is about 80 wt %. In yet another embodiment, the maximum concentration of water-soluble compounds in the fermentation residue is about 90 wt %. In a further embodiment, the maximum concentration of water-soluble compounds in the fermentation residue is about 100 wt %.

In any embodiment wherein the fermentation residue comprises at least about 90 wt % water-soluble compounds, the fermentation residue may be referred to as a "dry" fermentation residue.

Depending on the particular fermentation residue and intended application, any range of concentrations of the water-soluble compounds is possible. Preferred ranges include all possible ranges defined by any of the minimum concentrations and any of the maximum concentrations described above. In one embodiment, the fermentation residue comprises from about 20 wt % to about 100 wt % water-soluble compounds. In another embodiment, the fermentation residue is dry.

Fermentation residues, as described above, possess utility as a concrete admixture, either alone or with other admixtures. Admixtures are used routinely to improve the flow and setting properties in concrete.

Fermentation residues also possess utility in improving the flow properties or dispersion of any inorganic material that is mixed in water. One such material is gypsum mixed in water, the flow of which is improved, which property would be useful to improve the production process of wallboard (also known as drywall or gypsum panels, and commercially available under the tradename Sheetrock®, USG Corporation, Chicago, Ill.).

Fermentation residues also possess utility in dispersing filler, pigment, or both in water for applications in paper manufacture and paper coating operations.

Many of the embodiments of this invention, as described below, provide superior flow properties in mixed concrete with a low cost additive. Better flow is beneficial to make concrete fill the gaps between rebar in roadways and is helpful when pumping concrete into forms. Additionally, improved flow allows less water to be used during mixing concrete, thus typically resulting in stronger cured strength.

Similarly, in the production of wallboard, better flow allows less water to be used during mixing, thus typically allowing reduced drying costs in the wallboard manufacturing process.

After the fermentation residue has been separated and, if desired, concentrated, the fermentation residue is combined with a cementitious material, to form a composition comprising a cementitious material and a fermentation residue.

A "cementitious material," as the term is used herein, is any material which, when a dry powdered form thereof is wetted and allowed to set, will yield a rigid unitary solid. In one embodiment, the cementitious material is a cement. In another embodiment, the cementitious material is gypsum. In a further embodiment, the cementitious material is selected from the group consisting of cements and gypsum.

In one preferred embodiment, the cementitious material is Type I Portland cement.

The composition comprising the fermentation residue and the cementitious material can be in any form. Typical forms include, but are not limited to, a dry composition wherein the cementitious material, the fermentation residue, and other components are present in a homogeneous mixture of powdered ingredients (commonly termed a "premix"), such as is commonly commercially available as a ready-mix cement, concrete, mortar, or grout, among others; a slurry wherein the cementitious material, the fermentation residue, and other components are mixed with water, such as is commonly prepared prior to pouring a cement, concrete, mortar, grout, drywall panel, among others; and a set composition, such as is formed after a poured slurry is allowed to set. Any composition described herein can be in any form described above or known to one of ordinary skill in the art.

The composition can comprise fermentation residue water-soluble compounds and cementitious material in any weight ratio. However, certain weight ratios will provide compositions that are more economical, have more desirable functional properties, or both. In one embodiment, the minimum weight ratio of fermentation residue water-soluble compounds to cementitious material is about 0.1 oz. fermentation residue water-soluble compounds per 100 pounds cementitious material. In another embodiment, the minimum weight ratio of fermentation residue water-soluble compounds to cementitious material is about 0.5 oz. fermentation residue water-soluble compounds per 100 pounds cementitious material. In yet another embodiment, the minimum weight ratio of fermentation residue water-soluble compounds to cementitious material is about 1.0 oz. fermentation residue water-soluble compounds per 100 pounds cementitious material.

In one embodiment, the maximum weight ratio of fermentation residue water-soluble compounds to cementitious material is about 2.5 oz. fermentation residue water-soluble compounds per 100 pounds cementitious material. In another embodiment, the maximum weight ratio of fermentation residue water-soluble compounds to cementitious material is about 5.0 oz. fermentation residue water-soluble compounds per 100 pounds cementitious material. In yet another embodiment, the maximum weight ratio of fermentation residue water-soluble compounds to cementitious material is about 10 oz. fermentation residue water-soluble compounds per 100 pounds cementitious material. In a further embodiment, the maximum weight ratio of fermentation residue water-soluble compounds to cementitious material is about 20 oz. fermentation residue water-soluble compounds per 100 pounds cementitious material. In yet a further embodiment, the maximum weight ratio of fermentation residue water-soluble compounds to cementitious material is about 50 oz. fermentation residue water-soluble compounds per 100 pounds cementitious material.

Depending on the particular fermentation residue, cementitious material, and intended application, among other parameters, any weight ratio of fermentation residue water-soluble compounds to cementitious material is possible. Preferred ranges include all possible ranges defined by any of the minimum weight ratios and any of the maximum weight ratios described above. In one preferred embodiment, the composition comprises from about 0.1 oz. fermentation residue water-soluble compounds per 100 pounds cementitious material to about 50 oz. fermentation residue water-soluble compounds per 100 pounds cementitious material. In another embodiment, the composition comprises from about 1 oz. fermentation residue water-soluble compounds per 100 pounds cementitious material to about 20 oz. fermentation residue water-soluble compounds per 100 pounds cementitious material.

In one embodiment, a weight ratio of from about 1.0 oz. fermentation residue water-soluble compounds per 100 pounds cement to about 7.0 oz. fermentation residue water-soluble compounds per 100 pounds cement is suitable for use in a Type "A" or Type "D" concrete admixture (American Society for Testing and Materials (ASTM) Standard C494 (West Conshohocken, Pa.)). In one embodiment, a weight ratio of from about 8.0 oz. fermentation residue water-soluble compounds per 100 pounds cement to about 25.0 oz. fermentation residue water-soluble compounds per 100 pounds cement is suitable for use in a Type "F" or Type "G" concrete admixture (ASTM C494). Such concrete admixtures, as well as others that will be known to one of ordinary skill in the art, typically require additional components, such as water, aggregate, and in some cases, various additives. These additional components will be discussed below.

In addition to the fermentation residue and the cementitious material, at least one additional material can be added to the composition.

The composition may further comprise water in addition to any water present in the fermentation residue. The composition can comprise water when the composition is in a slurry (unset) form or in a set form. When the composition is in a slurry form, the concentration of water, including both water present in the fermentation residue and water added separately to the composition (which may be referred to herein as "total water"), is typically reported as a water-cement ratio, defined as the weight of total water divided by the weight of the cementitious material. In one embodiment of a slurry form, particularly suitable for concrete applications, the composition has a lower limit to the water-cement ratio of about 0.25. In another embodiment of the slurry form, the composition has a lower limit to the water-cement ratio of about 0.3. In a further embodiment of the slurry form, the composition has a lower limit to the water-cement ratio of about 0.35.

In one embodiment of the slurry form, the composition has an upper limit to the water-cement ratio of about 0.75. In another embodiment of the slurry form, the composition has an upper limit to the water-cement ratio of about 0.7. In a further embodiment of the slurry form, the composition has an upper limit to the water-cement ratio of about 0.65.

Depending on the particular fermentation residue, cementitious material, and intended application, among other parameters, any economically- and functionally-desirable water-cement ratio is possible for a slurry form of the composition. Preferred ranges for concrete applications include all possible ranges defined by any of the minimum water-cement ratio and any of the maximum water-cement ratio described above. In one preferred embodiment of the slurry form, the composition has a water-cement ratio from about 0.25 to about 0.75.

The composition may further comprise an additive which imparts one or more desirable properties to the composition, either in a dry form, a slurry, a set form, or two or more of the above. The additive can comprise one active ingredient or a plurality of active ingredients, as well as fillers, carriers, and other ingredients. In various preferred embodiments, the additive is selected from one of several groups wherein each group independently comprises one or more of flow improvers, plasticity improvers, water reducers, strengtheners, set retarders, set accelerators, air entrainers, corrosion inhibitors, or shrink compensation agents. In one preferred embodiment, the additive is selected from the group consisting of a flow improver, a plasticity improver, a water reducer, a strengthener, a set retarder, a set accelerator, an air entrainer, and a shrink compensation agent.

The composition may comprise more than one additive. Desirably, each additive will be selected so as to not interfere with the functional properties of the fermentation residue, the cementitious material, and the other additive or additives, if any.

Specific examples of additives useful in the composition include various maltodextrins containing from 1–100 dextrose equivalents (DE), such as Star-Dri 200 (a 20 DE maltodextrin made from normal corn starch) (A. E. Staley, Decatur, Ill.), setting accelerators such as triethanolamine (Sigma Chemical, St. Louis, Mo.), and RM35C and RM1000C (International Admixtures Inc., Boca Raton, Fla.). For such additives, as well as many others, the additive can be present at a wide range of concentrations. In one embodiment, the additive is present at at least about 5 wt % relative to fermentation residue water-soluble compounds. In another embodiment, the additive is present at at least about 10 wt % relative to fermentation residue water-soluble compounds. In a further embodiment, the additive is present at at least about 15 wt % relative to fermentation residue water-soluble compounds.

In one embodiment, the additive is present at no more than about 50 wt % relative to fermentation residue water-soluble compounds. In another embodiment, the additive is present at no more than about 40 wt % relative to fermentation residue water-soluble compounds. In a further embodiment, the additive is present at no more than about 30 wt % relative to fermentation residue water-soluble compounds.

In one preferred embodiment, the additive is present at from about 5 wt % to about 50 wt % relative to fermentation residue water-soluble compounds.

The composition may further comprise aggregate. Aggregate can be any material suitable for bulking and strengthening. The inclusion of aggregate distinguishes concrete from cement. Commonly used aggregates include sand, gravel, crushed rock, and mixtures thereof, although any aggregate known to one of ordinary skill in the art can be used. Sand is commonly referred to as "fine aggregate," and gravel, crushed rock, or a mixture thereof is commonly referred to as "coarse aggregate." Aggregate may be a component of the composition when the composition is in a dry (premix) form, a slurry form, or a set form.

Any amount of aggregate suitable for the intended type of concrete to be prepared from a composition comprising the aggregate can be used. In one embodiment, the aggregate is present at at least about 0.1 lbs/lb cementitious material. In another embodiment, the aggregate is present at at least about 1 lb/lb cementitious material. In a further embodiment, the aggregate is present at at least about 4 lbs/lb cementitious material.

In one embodiment, the aggregate is present at no more than about 10 lbs/lb cementitious material. In another embodiment, the aggregate is present at no more than about 8 lbs/lb cementitious material. In a further embodiment, the aggregate is present at no more than about 6 lbs/lb cementitious material.

In one preferred embodiment, the aggregate is present at from about 0.1 lbs/lb cementitious material to about 10 lbs/lb cementitious material. In another preferred embodiment, the aggregate is present at from about 4 lbs/lb cementitious material to about 6 lbs/lb cementitious material.

In various embodiments, the composition comprises one or more of at least one additional material selected from water; aggregate; at least one additive selected from the group consisting of flow improvers, plasticity improvers, water reducers, strengtheners, set retarders, set accelerators, air entrainers, corrosion inhibitors, and shrink compensation agents; water and aggregate; water and at least one additive listed above; aggregate and at least one additive listed above; or water, aggregate, and at least one additive listed above. Alternatively or in addition to the above, further materials known to one of ordinary skill in the art may be added to the composition.

The order of addition of the various components of the composition is generally not crucial. However, water is generally only added as part of the process of forming a cementitious structure.

Upon the preparation of the composition comprising the fermentation residue and the cementitious material, a slurry can be prepared, formed, and set to yield a cementitious structure.

By "cementitious structure" is meant any structure or structural element which can be produced by the pouring and setting of a slurry comprising water and a cementitious material. After pouring and before setting, the structure may be referred to as an "unset cementitious structure." After setting, the structure may be referred to as a "set cementitious structure." Cementitious structures include foundations, floors, walls, slabs, construction panels, roads, bridges, mortar, grout, terrazo, and adhesive, among many others.

First, the water is added to the fermentation residue and the cementitious material, to yield a slurry. Further components which can be combined with the fermentation residue, the cementitious material, and water include aggregate. Any aggregate as described above can be used. An additive, such as the additives described above, can also or alternatively be combined with the fermentation residue, the cementitious material, and water. The components, and any others that may be present, can be combined in any apparatus useful in containing, mixing, or allowing both to be performed on the components. Typically, the slurry is agitated to provide a homogeneous mixture and retard setting until after an unset cementitious structure is formed.

Forming the slurry into an unset cementitious structure can be performed by any appropriate technique known in the art. As is well known in the art, forming typically involves pouring, spraying, or otherwise introducing the slurry into a mold, form, or other structure. Within the space defined by the mold or form may be placed, prior to forming, an object or material such as rebar for the purpose of enhancing the strength or other structural properties of the set cementitious structure to be produced by the method.

Thereafter, the unset cementitious structure undergoes setting, to yield the cementitious structure. Setting proceeds by processes known in the art, and can be accelerated or retarded by the inclusion of various additives in the composition or by other processing techniques, as is known in the art.

In another embodiment, the present invention relates to a composition, comprising:
 a fermentation residue,
 water, and
 an inorganic material dispersed in the water.

The fermentation residue and the water are as described above. The fermentation residue may be prepared by separation from a microorganism biomass and concentrating the water-soluble compounds of the fermentation residue, as described above.

By "inorganic material" is meant a material not comprising carbon. In one embodiment, the inorganic material is a filler for paper manufacture or coating. In another embodiment, the inorganic material is a pigment for paper manufacture or coating. In a further embodiment, the inorganic material is selected from the group consisting of paper fillers and paper pigments.

Dispersal of the inorganic material in the water can be affected by any technique known in the art, such as dissolution, suspension, and emulsification, among others. Various of these techniques may call for further compounds, such as surfactants or emulsifiers, as will be apparent to one of ordinary skill in the art.

In another embodiment, the present invention relates to a method of preparing a composition comprising a fermentation residue, water, and an inorganic material dispersed in the water, the method comprising:
 growing a microorganism on a medium, to form at least a microorganism biomass and a fermentation residue;
 separating the fermentation residue from the microorganism biomass; and
 combining the fermentation residue with the water and the inorganic material, to form the composition.

The growing and separating steps, and the compositions acted on or yielded by these steps, are essentially the same as those described in the context of fermentation, above. The fermentation may result in the formation of one or more target products, and those compounds may be removed prior to the separating step, as described above in the context of fermentation. Also as described above, one or more compounds may be partially or completely removed from the fermentation residue prior to the combining step. In the combining step, the inorganic material is as described above, and combining can be performed according to any appropriate technique known in the art.

In another embodiment, the present invention relates to a method of producing a paper structure containing an inorganic material, comprising:

combining a fermentation residue with water and an inorganic material, to yield a solution;

treating the paper structure with the solution, to yield a treated paper structure; and removing water from the treated paper structure, to yield the paper structure containing the inorganic material.

The solution comprising the fermentation residue, water, and the inorganic material is as described above, and combining can be performed by any appropriate technique.

The paper structure can be any structure comprising paper, paperboard, cardstock, cardboard, or any other material in any known form, including, but not limited to, printing paper, cartons, and carton blanks, among others. The paper structure may contain materials other than the inorganic material, and these materials may be added before, after, or contemporaneously with the inorganic material added during the performance of the method.

In the treating step, the paper structure is contacted with the solution by any appropriate technique. Such techniques include, but are not limited to, immersion of the paper structure in the solution, spraying the solution onto the paper structure or a surface thereof, and applying the solution via a brush or roller to the paper structure or a surface thereof, among others. The duration of the treating step, as well as the temperature of the solution and other relevant process parameters, can readily be determined for a given application by one of ordinary skill in the art.

The treating step yields a paper structure comprising water, the inorganic material, and the fermentation residue. Thereafter, the water is removed from the paper structure during the removing step. Removing water can be performed by any appropriate technique that does not impair the structure and physical properties of the paper structure. Such techniques include, but are not limited to, evaporation, including evaporation assisted by heat, vacuum, or both, among others. By "removing," in this context, is meant that at least about 90 wt % of all water present in the portion of the solution present in the paper structure after the treating step is eliminated from the paper structure.

After removal of water, the paper structure comprises the inorganic material and is suitable for further processing and use.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

The beneficial flow properties of beer still bottoms (BSB) filtrate concentrate (a "fermentation residue" as defined above) are reported below as observed in concrete mixing studies, mortar mixing studies, and in gypsum (wallboard) mixing studies.

Example 1

Pilot Scale Fractionation

Three 55-gallon drums of "raw" BSB were subjected to microfiltration. The configuration of the microfiltration apparatus was as follows:

Feed pump-Waukesha Model 60 with a VFD.

Circulation pump-Waukesha Model 220 (165 gpm)

Elements: 3 housings, in series, with 3 ceramic elements in each housing

1 housing-1400 nm pore-Membralox

2 housing-800 nm pore-Membra Flow

3 housing-200 nm pore-Membra Flow

All elements had 6 mil lumen.

Each Element Area=0.36 $m^2$

It took about 30 minutes to collect approximately 90 gallons of filtrate (~210 $L/m^2/hr$ (LMH)). The yeast retentate was discarded. The filtrate was then processed on a drum scale evaporator in a pilot plant to bring the dry solids level up to about 50%. It took 5 hours of evaporation to give 8 gallons of Concentrated BSB filtrate product.

The following evaporation conditions were found to work well:

| | |
|---|---|
| Steam | 12 psig |
| Feed Pump | 56–57% |
| Extraction Pump | 58–59% |
| Vacuum | 23 inches Hg |
| Product Temperature | 140° F. |

The following analytical results for Concentrated BSB filtrate were obtained (Table 1):

TABLE 1

| | | |
|---|---|---|
| Ash | 8.56 | %_as is |
| Moisture | 54.57 | %_as is |
| Protein | 10.96 | %_as is |
| Fat | 0.03 | %_as is |
| Glycerol | 9.33 | %_as is |
| Arabitol | 0.31 | %_as is |
| Sorbitol | 0.70 | %_as is |
| Trehalose | 1.14 | %_as is |
| Glucose | 0.93 | %_as is |
| Fructose | 0.09 | %_as is |
| Iso-Maltose | 1.21 | %_as is |
| Maltose | 0.25 | %_as is |
| Maltotriose | 0.02 | %_as is |
| Panose | 0.29 | %_as is |
| Linear Highers (dp4–dp24) | 0.01 | %_as is |
| Non Linear Highers (dp4–dp24) | 3.91 | %_as is |
| Lactate | 5.21 | %_as is |
| Acetate | 0.19 | %_as is |
| Formate | 0.00 | %_as is |
| Pyruvate | 0.12 | %_as is |
| Chloride | 0.52 | %_as is |
| Succinate | 0.99 | %_as is |
| Sulfate | 0.59 | %_as is |
| Oxalate | 0.28 | %_as is |
| Phosphate | 2.89 | %_as is |

"Highers," as the term is used herein, refers to dextrose oligomers comprising from 4 to 24 dextrose units. "Linear highers" are dextrose oligomers that do not comprise branched or cyclic structures. "Nonlinear highers" are dextrose oligomers comprising branched or cyclic structures.

Example 2
Truckload Scale Fractionation

Microfiltration of 5,100 gallons of BSB (to remove the yeast bodies) was accomplished in about 4 hours at 150° F. The microfiltration apparatus housed ceramic membranes with an average pore size of 50 nm. The microfiltration was performed at a pressure of 38 psig, a feed flow rate of about 31 gpm, and a recirculation flow rate of about 11 gpm. This process produced 4,600 gallons of permeate at an average rate of 20 gpm (~285 LMH).

Evaporation of the filtrate was completed in about 48 hours. At an early stage of the evaporation, we applied 550 lb/hr of steam at a vacuum of 18 inches of mercury. This resulted in an evaporation rate of about 400 lb/hr of water at a temperature of 150° F. At a later stage of the evaporation, we increased the steam to 1,050 lb/hr at a vacuum of 22 inches of mercury. This resulted in an evaporation rate of about 800 lb/hr of water at a temperature of 134° F.

Heating for the evaporator was discontinued when the product refractive index (RI; measured at 40° C. on an Atago RX-500 refractometer, with distilled water RI measured as 1.3307) reached 1.3907 to yield 280 gallons of Concentrated BSB filtrate product at approximately 40% dry solids. The product was collected in five 55-gallon drums and one 5-gallon pail.

The following analytical results for Concentrated BSB filtrate were obtained (Table 2):

TABLE 2

| Ash | 7.74 | %_as is |
| Moisture | 65.08 | %_as is |
| Protein | 8.36 | %_as is |
| Fat | 0.02 | %_as is |
| Glycerol | 6.52 | %_as is |
| Arabitol | 0.18 | %_as is |
| Sorbitol | 0.18 | %_as is |
| Trehalose | 0.51 | %_as is |
| Glucose | 1.13 | %_as is |
| Fructose | 0.06 | %_as is |
| Iso-Maltose | 1.17 | %_as is |
| Maltose | 0.17 | %_as is |
| Maltotriose | 0.04 | %_as is |
| Panose | 0.08 | %_as is |
| Linear Highers (dp4–dp24) | 0.05 | %_as is |
| Non Linear Highers (dp4–dp24) | 2.88 | %_as is |
| Lactate | 3.53 | %_as is |
| Acetate | 0.12 | %_as is |
| Formate | 0.02 | %_as is |
| Pyruvate | 0.11 | %_as is |
| Chloride | 0.44 | %_as is |
| Succinate | 1.04 | %_as is |
| Sulfate | 0.59 | %_as is |
| Oxalate | 0.23 | %_as is |
| Phosphate | 3.01 | %_as is |

It should be noted that chloride, sulfate, and phosphate from this analysis are double counted both under "ash" and in their own right. After taking this observation into account, greater than 99% of the mass of the material is accounted for.

The majority of the Concentrated BSB Filtrate used in the following examples was taken from the batch whose analysis is shown above in Table 2. The fermentation residue of Table 2 may be referred to herein as "O2-002." Substantially all of the remaining Concentrated BSB Filtrate used in the examples was taken from a second batch, whose analysis was given in Table 1.

Although a number of components of BSB differ in their levels between the two batches, no significant difference in functional properties between the two batches was seen.

Example 3
Pilot Scale Study of Concentrated BSB Filtrate as a Mortar Admixture

A pre-weighed 1.0 kg portion of Portland cement (Type I, LaFarge Corp., Herndon, Va.) was placed in the bowl of a 5-quart mixer (Kitchen Aid, U.S.A., St. Joseph, Mich.). A 1.0 kg portion of sand was likewise added to the mixer. Then 380 grams of water (or water including test agent) was added to the mixing bowl. The mixer was then switched on and allowed to mix at the lowest setting for 60 seconds. The water-cement ratio, defined as the weight of water divided by the weight of cement in the mixture, was equal to 0.38 in this case (W/C=0.38).

Immediately after mixing was complete, a portion of the mortar was placed into a flow table cone. The cone was filled carefully to ensure that voids were not introduced during filling and that the cone was completely filled and level at the top.

Next, the cone was carefully removed, and the diameter of the mortar pile was measured at three places around the circumference of the pile with a caliper. The results were recorded and the average was reported as the initial, or "0 drop," flow in inches. Then one end of the drop table was lifted 1 inch above its resting position and allowed to drop freely. This dropping action caused the mortar to flow out radially from its initial position and the diameter of the mortar pile tended to increase as a function of this vibration. A total of 5 drops were performed in succession, and the mortar pile was once again measured at three places around the circumference of the pile with a caliper. The results were recorded and the average was reported as the "5 drop" flow in inches. Five more drops were then applied to the sample to give the "10 drop" flow in a similar manner. A greater diameter indicates greater flow of the mortar pile.

After the flow test was complete, the remainder of the mortar mix was transferred to a plastic container for a set-time assay. The material was "worked" a bit in the plastic container to ensure that no voids were present and that the material was evenly distributed in the container. The container was then transferred to a forced air oven set to 100° F. for the duration of the set-time assay. During this test, the sample was periodically removed from the oven and tested with a hand penetrometer for its compressive strength. The set-time for this assay was defined as the time it took for the mortar to reach a compressive strength of 500 psi as determined with the penetrometer. Triplicate measurements were taken and the average recorded about every 30 minutes until the endpoint was reached. More frequent measurements were taken near the endpoint so that an accurate set-time could be determined. The final measurements just below and above the 500 psi target were used to interpolate the time where a compressive strength of 500 psi was reached and this time was recorded as the set-time for the experiment.

Typically, products were tested at a few levels of addition to evaluate the "dose-response" relationship. Admixture preparations for mortar and concrete are typically liquids with a dry solids content in the range of 30 to 50% solids. The industry also tends to report admixture dosages based on fluid ounces per 100 pounds of cement in the formula. Both the concentration of the admixture and the amount of admixture used relative to the weight of cement in the mix must be defined to quantify the effects of the active ingredients on the functional properties.

Usually a "no admix" control mortar sample was run for a baseline comparison. Results from a recent test using O2-002 with quantities given as fl. oz. per 100 pounds cement are shown below (Table 3):

TABLE 3

| Admixture | 0 drop inches | 5 drop inches | 10 drop inches | set-time hours |
|---|---|---|---|---|
| no admix control | 4.0 | 5.9 | 6.8 | 2.3 |
| O2-002 @ 5 oz | 5.1 | 6.7 | 7.7 | 3.3 |
| O2-002 @ 10 oz | 5.2 | 6.8 | 7.8 | 4.2 |
| O2-002 @ 15 oz | 5.9 | 7.2 | 8.3 | 5.0 |

In this test, a dose dependent increase in flow was caused by the O2-002 relative to the no admix control. A dose dependent retardation of set-time due to the O2-002 was also seen in this study.

Example 4
Pilot Scale Study of Concentrated BSB Filtrate as a Mortar Admixture in Conjunction with Further Additives In the next test, we investigated the effect of adding RM1000C (IAI, Boca Raton) to O2-002 on the flow properties of mortar. Two parts of RM1000C were added to seven parts O2-002 in the test admixture. The results are shown in Table 4. An additional increase in flow was seen with the addition of RM1000C to the O2-002.

TABLE 4

| Admixture | dosage oz/100# | 0 drop inches | 5 drop inches | 10 drop inches |
|---|---|---|---|---|
| no admix control | 0 | 3.9 | 5.3 | 6.2 |
| O2-002 | 10 | 5.3 | 6.6 | 7.5 |
|  | 15 | 6.0 | 7.5 | 8.1 |
|  | 20 | 6.1 | 7.8 | 8.7 |
| O2-002 (with RM1000C) | 10 | 6.6 | 8.1 | 9.1 |
|  | 15 | 6.7 | 8.4 | 9.5 |
|  | 20 | 6.6 | 8.4 | 9.5 |

Example 5
Pilot Scale Study of Concentrated BSB Filtrate as a Mortar Admixture in Conjunction with Further Additives Another mortar study was performed to measure flow and set-time on a wider range of doses for the O2-002/RM1000C (7:2) combination, and results shown in Table 5, below. In this test, a dose dependent increase in flow was seen for the admixture. A dose dependent increase in set-time was seen up to a dose of 15 oz, then the trend reversed giving shorter set-times at higher doses.

TABLE 5

| Admixture | dosage oz/100# | 0 drop inches | 5 drop inches | 10 drop inches | set-time hours |
|---|---|---|---|---|---|
| no admix control | 0 | 4.3 | 5.3 | 6.2 | 2.3 |
| O2-002 (with RM1000C) | 5 | 5.9 | 6.9 | 7.6 | 3.6 |
|  | 10 | 6.4 | 8.1 | 9.1 | 3.0 |
|  | 15 | 6.5 | 8.3 | 9.3 | 4.2 |
|  | 20 | 6.6 | 8.4 | 9.5 | 4.1 |
|  | 25 | 6.8 | 8.7 | 9.5 | 3.0 |

Example 6
Pilot Scale Study of Concentrated Molasses Solubles (CMS) as a Mortar Admixture A mortar study was performed on a different fermentation residue to show the general utility of the present invention. Concentrated Molasses Solubles (CMS) is obtained from fermentation of Corynebacterium where lysine is produced as the target product. After the target product is removed by ion exchange chromatography, and the biomass is filtered off, the fermentation residue is evaporated to provide CMS. The CMS had the following analysis:

| Total Nitrogen | 6–7% |
|---|---|
| Ammonia Nitrogen | 5% |
| Phosphorous ($P_2O_5$) | 0.2% |
| Potassium ($K_2O$) | 0.2–0.4% |
| Sulfates | 15–20% |
| Chlorides | 2% |
| pH | 4 to 5 |
| Total Solids | 42–46% |

In this example a mortar test was conducted to measure flow and set-time on a range of admixture doses for the CMS (used "as is" at about 44% solids). Results are shown in Table 6, below. In this test, a significant dose dependent increase in flow was seen for the CMS admixture up to the 10 oz dose. A slight reduction in flow was seen at 15 oz when compared to the 10 oz results. A dose dependent increase in set-time was seen up to a dose of 15 oz for the CMS.

TABLE 6

| Admixture | dosage oz/100# | 0 drop inches | 5 drop inches | 10 drop inches | set-time hours |
|---|---|---|---|---|---|
| no-admix control | 0 | 4.1 | 5.8 | 6.8 | 2.4 |
| Conc. Molasses Solubles | 5 | 5.5 | 7.1 | 8.1 | 2.8 |
|  | 10 | 5.7 | 7.6 | 8.6 | 3.2 |
|  | 15 | 4.7 | 7.2 | 8.4 | 3.8 |

Example 7
Pilot Scale Study of Concentrated BSB Filtrate as a Concrete Admixture in Conjunction with Further Additives The concrete formula used in this test included 10.0 kg of Portland cement (Type 1, LaFarge), 29.5 kg of coarse aggregate (¾" stone), 24.3 kg of fine aggregate (sand) and 5.5 kg of water (or water+admixture). This formula resulted in a water-cement ratio of 0.55 (W/C=0.55).

The inside of a mixer was lightly moistened with water before initiating mixing. The mixer was turned on, then 5.0 kg of water was added, followed by about half of the coarse aggregate and about half of the fine aggregate. Next, all of the cement was added a scoopful at a time. After the cement was mixed in over a few minutes, the remaining coarse and fine aggregate was added to the mixer. Finally, the last 0.5 kg of water (or water+admixture) was added and mixing was allowed to proceed another 2.5 minutes.

Immediately after the concrete mixing was complete, a portion of the concrete was transferred into a slump cone. The bottom third of the slump cone was filled, then subjected to twenty up and down strokes with an iron rod to ensure that voids were not introduced during filling. The "rodding" procedure was repeated after the cone was two-thirds full and also when the cone was completely filled and level at the top.

Next, the slump cone was carefully removed, and the distance that the concrete pile "slumped down" from its original height in the cone was measured with a ruler and is reported as inches of slump.

After the slump test was complete, a portion of the concrete was passed through a #4 screen and transferred to a plastic container for the set-time assay. The material was "worked" a bit in the plastic container to ensure that no voids were present and that the material was evenly distributed in the container. The container was covered and allowed to sit at room temperature for the duration of the set-time assay. During this test, the sample was periodically uncovered and tested with a hand penetrometer for its compressive strength. The set-time for this assay was defined as the time it took for the mortar to reach a compressive strength of 500 psi as determined with the penetrometer. Triplicate measurements were taken, and the average recorded, about every 30 minutes until the endpoint was reached. More frequent measurements were taken near the endpoint so that an accurate set-time could be determined. The final measurements just below and above the 500 psi target were used to interpolate the time where a compressive strength of 500 psi was reached and this time is recorded as the set-time for the experiment.

The remainder of the concrete is transferred to plastic molds to make concrete cylinders for compressive strength testing. Twenty up and down strokes with an iron rod were delivered to the concrete in the mold after the mold was one-third, two-thirds, and completely filled. The molds were capped with a plastic lid, then sent off to a concrete testing lab. The samples were typically tested for compressive strength on 1, 3, 7, and 28 days after mixing. The average of duplicate (or triplicate) tests are reported in units of psi.

Typically, products were tested at a few levels of addition to evaluate the "dose-response" relationship. Admixture preparations for mortar and concrete are typically liquids with a dry solids content in the range of 30 to 50% solids. The industry also tends to report admixture dosages based on fluid ounces per 100 pounds of cement in the formula. Both the concentration of the admixture and the amount of admixture used relative to the weight of cement in the mix must be defined to quantify the effects of the active ingredients on the functional properties. Usually a "no admix" control concrete mix was run for a baseline comparison. Results from a test using O2-002 are shown below (Table 7):

TABLE 7

| Admixture | slump inches | set-time hours | 7 day strength psi | 28 day strength psi |
| --- | --- | --- | --- | --- |
| no admix control | 1.9 | 3.5 | 5,527 | 7,039 |
| O2-002 @ 7.5 oz | 2.9 | 4.7 | 5,200 | 6,367 |
| O2-002 @ 15 oz | 8.8 | 5.9 | 2,795 | 3,511 |
| O2-002 (with RM1000C) @ 15 oz | 9.3 | 6.5 | 3,528 | 4,563 |

In this test, a dose dependent increase in slump was caused by the O2-002 relative to the no admix control. A dose dependent retardation of set-time due to the O2-002 was also seen in this study. A dose dependent decrease in strength was noted at 7 days and 28 days. Also in this test an additional ingredient, RM1000C (IAI, Boca Raton), was added to the O2-002. Blending RM1000C into the O2-002 admix gave improved results in the slump and strength tests when compared to the results seen with O2-002 alone.

Example 8

Study of Concentrated BSB Filtrate as a Concrete Admixture in Conjunction with Further Additives A series of slump, set-time and strength measurements were performed on concrete that had been treated with O2-002. Concrete was made with the test admixtures at a W/C=0.53 and an ambient temperature of approximately 70° F.

Concrete made in this test had the following material usage per cubic yard:

| | |
| --- | --- |
| Cement (Type I Portland) | 564 lbs. |
| Coarse Aggregate (#57 Limerock) | 1656 lbs. |
| Fine Aggregate (FDOT Concrete Sand) | 1316 lbs. |
| Water | 298 lbs. |

The test admixtures in this study were:

WRDA-64, a commercially available low range water reducing admixture manufactured by the W. R. Grace Co.

O2-002 blended with RM35C (IAI, Boca Raton, 7:1 ratio), a low range water reducing admixture.

O2-002 with RM1000C (IAI, Boca Raton, 7:2 ratio), a high range water reducing admixture.

Slump and set-time results from the independent testing are shown below (Table 8):

TABLE 8

| Admixture | dosage oz/100# cement | initial slump inches | 30 min slump inches | 45 min slump inches | initial set time hours | final set time hours |
| --- | --- | --- | --- | --- | --- | --- |
| WRDA-64 | 4 | 5.75 | 3 | 2.5 | 5.5 | 6.75 |
| O2-002 (with RM35C) | 5 | 8 | 5 | 3.5 | 4.75 | 6.25 |
| O2-002 (with RM35C) | 8 | 5.75 | 4.5 | 3.75 | 5.25 | 6.5 |
| O2-002 (with RM35C) | 10 | 6 | 2 | 1.75 | 7 | 9 |
| O2-002 (with RM1000C) | 10 | 8 | 5.75 | 4 | 8 | 9 |
| O2-002 (with RM1000C) | 15 | 10.25 | 8.25 | 5.5 | 10 | 12.5 |

In this study, a dose dependent increase in slump was caused by the O2-002. A dose dependent retardation of set-time due to the O2-002 was also seen in this study. The low range water reducing admixture containing O2-002 at 5 oz compared favorably with the commercially available material WRDA-64 at 4 oz.

Compressive strength results from the independent testing are shown below (Table 9):

TABLE 9

| Admixture | dosage oz/100# cement | 3 day strength psi | 7 day strength psi | 28 day strength psi |
| --- | --- | --- | --- | --- |
| WRDA-64 | 4 | 4,230 | 5,370 | 6,573 |
| O2-002 (with RM35C) | 5 | 3,540 | 5,090 | 6,295 |
| O2-002 (with RM35C) | 8 | n.t | n.t | n.t |
| O2-002 (with RM35C) | 10 | n.t | n.t | n.t |
| O2-002 (with RM1000C) | 10 | 4,650 | 6,630 | 7,960 |
| O2-002 (with RM1000C) | 15 | 3,250 | 5,680 | 6,780 |

The strength table shows that the treatments gave quite similar results with a possible indication of improved strength for the O2-002 (with RM1000C) at a dose of 10 oz.

Example 9
Field Trial of Concentrated BSB Filtrate as a Concrete Admixture in Conjunction with Further Additives A field trial was conducted at a ready-mix plant in order to assess the performance of O2-002 as a concrete admixture under "real-life" conditions. The trial was conducted at a W/C=0.54 and an ambient temperature of approximately 105° F.

Concrete made in this test had the following material usage per cubic yard:

| | |
|---|---|
| Cement (Type I Portland) | 540 lbs. |
| Coarse Aggregate (3/8" River Granite) | 1040 lbs. |
| Fine Aggregate (River Sand) | 1964 lbs. (contains 3% water) |
| Water | 233 lbs. |

The only test admixture used in this study was O2-002 with RM1000C (IAI, Boca Raton, 7:2 ratio) as a high range water reducing admixture.

The admixture was used at a dosage of 10 oz/100 lb of cement (4.2 gallons per 10 cubic yards). The initial slump was 8.5 inches, measured 10 minutes after mixing. At the job site, the slump was measured at 7.5 inches at 80 minutes after mixing. The batch continued to maintain a good plasticity even at 200 minutes after mixing, as it was pumped up to fill a second story beam loaded with rebar and completed the job without problems. Even though the material showed remarkable plasticity, especially considering the high temperature at the job site, it had built enough strength to enable a crew to finish a floor poured from the batch, with no difficulty, just 2 hours after pouring.

Example 10
Pilot Scale Study of Concentrated BSB Filtrate as an Admixture in Gypsum Panel Production For each sample, 75 grams of room temperature water (or water with admixture) was added to a 600-mL stainless steel beaker. Then, 100 g dry gypsum powder (National Gypsum Corporation, Charlotte, N.C.) was gently poured onto the water in the cup and a timer was started. A six-inch, stainless steel spatula was then used to gently push the gypsum under the surface of the water (without stirring) over 10–20 seconds.

After allowing the gypsum to wet until 70 seconds had elapsed on the timer, the slurry was vigorously mixed with the spatula for twenty seconds. When the timer showed 90 seconds had elapsed, the slurry was poured through a glass funnel positioned in a ring stand. The lower, small mouth of the funnel was positioned three inches above a glass plate. The diameter of the poured gypsum patty was measured using large calipers. The average of four measurements taken across the diameter of the patty was recorded.

After the gypsum patty had been poured onto the glass plate, the plate was moved under a ¼ lb. Gilmore needle. Elapsed time from the pouring of the patty was continuously monitored. The ¼ lb. Gilmore needle was lowered until the needle point just touched the gypsum patty, and then the needle was released. The force produced by the mass of the weight alone pushed the needle into the patty. When the ¼ lb. Gilmore needle only penetrated the patty to a depth of 1 mm, the elapsed time from pouring was recorded as the set-time.

Results from a recent test using O2-002 are shown below (Table 10):

TABLE 10

| Admixture | patty diameter inches | set-time minutes |
|---|---|---|
| no admix control | 3.5 | 4.58 |
| O2-002 @ 0.3% | 4.3 | 4.83 |
| O2-002 @ 0.6% | 4.6 | 6.58 |
| O2-002 @ 1.2% | 4.8 | >10.00 |

In this test, a dose dependent increase in flow was caused by the O2-002 relative to the no admix control. A dose dependent retardation of set-time due to the O2-002 was also seen in this study.

Summary statistics for all runs of O2-002 in gypsum can be found below (Table 11):

TABLE 11

| Admixture | patty diameter inches mean +/− SD | set-time minutes mean +/− SD |
|---|---|---|
| no admix control | 3.77 +/− 0.17 | 4.48 +/− 0.14 (n = 5) |
| O2-002 @ 0.3% | 4.27 +/− 0.03 | 4.88 +/− 0.21 (n = 5) |
| O2-002 @ 0.6% | 4.48 +/− 0.11 | 6.44 +/− 0.80 (n = 7) |
| O2-002 @ 1.2% | 4.63 +/− 0.12 | >10.00 (n = 7) |

Example 11
Study of Particular Components of Concentrated BSB Filtrate as Mortar Admixture In order to determine if a few of the high concentration ingredients found in O2-002 were mostly responsible for the activity seen in our applications testing, we tested both glycerol and lactic acid individually for activity in our mortar and gypsum assays. In the mortar assay, we matched the concentration of glycerol and lactic acid (9.3% and 5.2%) respectively to that found in O2-002. Results are shown in Table 12.

TABLE 12

| Admixture | dosage oz/100# | 0 drop inches | 5 drop inches | 10 drop inches | set-time hours |
|---|---|---|---|---|---|
| no admix control | 0 | 4.0 | 5.9 | 6.8 | 2.3 |
| glycerol | 5 | 4.1 | 6.0 | 7.1 | 2.3 |
| | 10 | 4.2 | 6.1 | 7.1 | 2.3 |
| | 15 | 4.3 | 5.8 | 6.8 | 2.3 |
| lactic acid | 5 | 3.9 | 6.0 | 7.0 | 2.3 |
| | 10 | 4.1 | 6.0 | 6.9 | 2.3 |
| | 15 | 4.0 | 6.1 | 7.0 | 2.3 |
| O2-002 | 5 | 5.1 | 6.7 | 7.7 | 3.3 |
| | 10 | 5.2 | 6.8 | 7.8 | 4.2 |
| | 15 | 5.9 | 7.2 | 8.3 | 5.0 |

The results show that individually, the glycerol and the lactic acid have virtually no response difference from the "no admix" control. The effect of the O2-002 in this study was pronounced, and as expected.

Example 12
Pilot Scale Study of Concentrated BSB Filtrate and Particular Components Thereof as an Admixture in Gypsum Panel Production A separate study in our gypsum assay is shown below, following procedures and using materials described below (Table 13):

TABLE 13

| Admixture | inclusion % | patty diameter inches | set-time minutes |
|---|---|---|---|
| no admix control | 0.0 | 3.8 | 4.48 |
| BSB "as is" | 0.6 | 3.6 | 4.33 |
|  | 1.2 | 3.7 | 4.58 |
| BSB retentate | 0.6 | 3.3 | 4.33 |
|  | 1.2 | 3.1 | 4.83 |
| O2-002 (BSB permeate) | 0.3 | 4.3 | 4.88 |
|  | 0.6 | 4.5 | 6.44 |
|  | 1.2 | 4.6 | >10.00 |
| glycerol | 0.3 | 4.3 | 4.83 |
|  | 0.6 | 4.2 | 4.58 |
|  | 1.,2 | 4.1 | 4.33 |
| lactic acid (50%) | 0.3 | 4.3 | 4.83 |
|  | 0.6 | 4.2 | 5.58 |
|  | 1.2 | 4.4 | 7.3 |

In this study, we tested 50% stock solutions of BSB retentate (yeast fraction), glycerol, and lactic acid, in addition to BSB "as is" directly from the fermentor. We also used our O2-002 preparation (35% solids). The BSB "as is" results were not significantly different from control, while the BSB retentate results showed a decrease in flow. Glycerol showed an increase in flow compared to control but may have shown an accelerated set at higher dose. Lactic acid paralleled the results seen with O2-002 fairly closely, but it was tested at ten times the level at which it was found in O2-002 (50% vs. 5%).

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit and scope of the invention as defined by the appended claims.

What is claimed is:

1. A composition, comprising:
a cementitious material, and
a fermentation residue, wherein the fermentation residue is a yeast ethanol fermentation residue and the fermentation residue comprises protein, glycerol, and at least one salt of an organic acid.

2. The composition of claim 1, wherein the cementitious material is selected from the group consisting of cements and gypsum.

3. The composition of claim 2, wherein the cementitious material is Type I Portland cement.

4. The composition of claim 1, wherein the fermentation residue is prepared by growing a microorganism on a medium, to form at least a microorganism biomass and the fermentation residue, and separating the fermentation residue from the microorganism biomass.

5. The composition of claim 4, wherein the separating is performed by microfiltration with at least one membrane having a pore size from about 50 nm to about 1500 nm.

6. The composition of claim 1, wherein the fermentation residue comprises from about 20 wt % to about 100 wt % water-soluble compounds.

7. The composition of claim 1, wherein the fermentation residue is dry.

8. The composition of claim 1, wherein the composition comprises from about 0.1 oz. fermentation residue water-soluble compounds per 100 pounds cementitious material to about 50 oz. fermentation residue water-soluble compounds per 100 pounds cementitious material.

9. The composition of claim 8, wherein the composition comprises from about 1 oz. fermentation residue water-soluble compounds per 100 pounds cementitious material to about 20 oz. fermentation residue water-soluble compounds per 100 pounds cementitious material.

10. The composition of claim 1, further comprising water other than any water present in the fermentation residue.

11. The composition of claim 10, wherein the water-cement weight ratio is from about 0.25 to about 0.75.

12. The composition of claim 1, further comprising an additive selected from the group consisting of flow improvers, plasticity improvers, water reducers, strengtheners, set retarders, set accelerators, air entrainers, corrosion inhibitors, and shrink compensation agents.

13. The composition of claim 12, wherein the additive is present at from about 5 wt % to about 50 wt % relative to fermentation residue water-soluble compounds.

14. The composition of claim 1, further comprising aggregate.

15. The composition of claim 14, wherein the aggregate is present at from about 0.1 lbs/lb cementitious material to about 10 lbs/lb cementitious material.

16. The composition of claim 15, wherein the aggregate is present at from about 4 lbs/lb cementitious material to about 6 lbs/lb cementitious material.

17. The composition of claim 1, wherein the fermentation residue comprises, by weight, from about 8 wt % to about 11 wt % protein, from about 0.01 wt % to about 0.04 wt % fat, from about 6 wt % to about 10 wt % glycerol, from about 0.1 wt % to about 0.4 wt % arabitol, from about 0.1 wt % to about 0.8 wt % sorbitol, from about 0.5 wt % to about 1.2 wt % trehalose, from about 0.9 wt % to about 1.2 wt % glucose, from about 0.05 wt % to about 0.10 wt % fructose, from about 1.1 wt % to about 1.3 wt % isomaltose, from about 0.1 wt % to about 0.3 wt % maltose, from about 0.01 wt % to about 0.05 wt % maltotriose, from about 0.07 wt % to about 0.30 wt % panose, from about 0.01 wt % to about 0.06 wt % linear 4–24 unit dextrose oligomers, from about 2 wt % to about 4 wt % nonlinear 4–24 unit dextrose oligomers, from about 3 wt % to about 6 wt % lactate, from about 0.1 wt % to about 0.2 wt % acetate, from about 0 wt % to about 0.03 wt % formate, from about 0.1 wt % to about 0.2 wt % pynuvate, from about 0.4 wt % to about 0.6 wt % chloride, from about 0.9 wt % to about 1.1 wt % succinate, from about 0.5 wt % to about 0.7 wt % sulfate, from about 0.2 wt % to about 0.3 wt % oxalate, and from about 2 wt % to about 4 wt % phosphate.

18. A method of preparing a composition comprising a cementitious material and a fermentation residue, wherein the fermentation residue is a yeast ethanol fermentation residue and the fermentation residue comprising protein, glycerol, and at least one salt of an organic acid, the method comprising:
growing a yeast on a medium, to form at least a microorganism biomass, a fermentation residue, and at least one target product selected from the group consisting of ethanol and lysine;
separating the fermentation residue from the microorganism biomass; and
combining the fermentation residue with the cementitious material, to form the composition.

19. The method of claim 18, further comprising concentrating the fermentation residue water-soluble compounds prior to combining the fermentation residue with the cementitious material.

20. The method of claim 18, wherein the cementitious material is selected from the group consisting of cements and gypsum.

21. The method of claim 18, wherein the separating is performed by microfiltration with at least one membrane having a pare size from about 50 nm to about 1500 mm.

22. The method of claim 18, wherein the method further comprises removing the at least one target product from the medium, to retain the microorganism biomass and the fermentation residue.

23. The method of claim 18, further comprising removing one or more compounds from the fermentation residue prior to the combining step.

24. The method of claim 18, further comprising combining the fermentation residue and the cementitious material with at least one additional material selected from group consisting of water, aggregate, and additives selected from the group consisting of flow improvers, plasticity improvers, water reducers, strengtheners, set retarders, set accelerators, air entrainers, corrosion inhibitors, and shrink compensation agents.

25. A method of producing a cementitious structure, comprising:

combining at least a yeast ethanol fermentation residue, wherein the fermentation residue comprises protein, glycerol, and at least one salt of an organic acid; a cementitious material; and water, to yield a slurry;

forming the slurry into an unset cementitious structure; and setting the unset cementitious structure, to yield the cementitious structure.

26. The method of claim 25, wherein the cementitious material is selected from the group consisting of cements and gypsum.

27. The method of claim 25, wherein the combining step further comprises combining aggregate with the fermentation residue, the cementitious material, and water.

28. The method of claim 25, wherein the cementitious structure is selected from the group consisting of foundations, floors, walls, slabs, construction panels, roads, mortar, grout, terrazo, and adhesive.

* * * * *

UNITED STATES PATENT AND TRADEMARK OFFICE
CERTIFICATE OF CORRECTION

PATENT NO. : 6,797,050 B2
DATED : September 28, 2004
INVENTOR(S) : Andrew J. Hoffman and Michael D. Harrison

It is certified that error appears in the above-identified patent and that said Letters Patent is hereby corrected as shown below:

Column 22,
Line 48, delete "pynuvate" and insert -- pyruvate --.

Column 23,
Line 8, delete "pare" and insert -- pore --.

Signed and Sealed this

Fifth Day of April, 2005

JON W. DUDAS
*Director of the United States Patent and Trademark Office*